United States Patent [15] 3,648,071
Mrazek [45] Mar. 7, 1972

[54] HIGH-SPEED MOS SENSE AMPLIFIER

[72] Inventor: Dale A. Mrazek, Los Altos Hills, Calif.
[73] Assignee: National Semiconductor Corp., Santa Clara, Calif.

[22] Filed: Feb. 4, 1970
[21] Appl. No.: 8,474

[52] U.S. Cl. ....307/237, 307/229, 307/251, 328/54, 328/169, 328/175, 330/96, 330/104, 330/110
[51] Int. Cl. ....H03k 5/08
[58] Field of Search ....307/237, 251, 304, 229; 328/54, 169, 175; 330/96, 103, 104, 110

[56] References Cited

UNITED STATES PATENTS

| | | | |
|---|---|---|---|
| 3,514,635 | 5/1970 | Gilbert | 307/237 |
| 3,564,430 | 2/1971 | Brudevold | 307/229 X |
| 3,104,358 | 9/1963 | Heacock, Jr. | 330/104 X |
| 3,435,375 | 3/1969 | Miller, Jr. | 331/110 |
| 3,502,905 | 3/1970 | Bicking | 307/251 X |
| 3,529,251 | 9/1970 | Edwards | 330/110 X |
| 3,537,025 | 10/1970 | Baum et al. | 330/103 |
| 3,535,550 | 10/1970 | Kang | 307/237 |
| 3,393,369 | 7/1968 | Embley et al. | 307/229 |
| 3,320,532 | 5/1967 | Watters | 330/110 X |
| 3,378,779 | 4/1968 | Priddy | 307/251 X |
| 3,386,053 | 5/1968 | Priddy | 307/304 X |
| 3,517,179 | 6/1970 | Herndon | 307/304 X |

*Primary Examiner*—Stanley T. Krawczewicz
*Attorney*—Lowhurst & Hamrick

[57] ABSTRACT

An improved sense amplifier comprised of an all FET amplifying circuit having means for limiting the voltage swing of the read potential applied thereby to an integrated circuit memory array in sensing the stored "1" and "0" memory states. The amplifier includes upper and lower output level-limiting circuits which detect predetermined signal levels in the output signal of the amplifier and cause the impedances at the input of the amplifier to be adjusted to limit the output signal swing of the amplifier to within the predetermined signal leads. In so doing, the memory read potential is also constrained to swing within certain predetermined limits.

6 Claims, 3 Drawing Figures

INVENTOR.
DALE A. MRAZEK

BY Harvey J. [signature]

ATTORNEY

INVENTOR.
DALE A. MRAZEK
BY [signature]
ATTORNEY

HIGH-SPEED MOS SENSE AMPLIFIER

BACKGROUND OF THE INVENTION

The present invention relates generally to sense amplifiers of the type used to provide read out for integrated circuit memory apparatus and, more particularly, to an improved MOS-FET sense amplifier apparatus having novel feedback output clamp circuitry providing small signal, high-speed, memory readout.

One of the problems encountered in the use of memory devices of the MOS-FET type is that the design tolerance of the components of the memory must be high enough to accommodate the input requirements of the available sense amplifier used to read out the data stored in the memory. For example, where the sense amplifier requires a certain voltage swing at its input, the potential handling characteristics of the memory device must be capable of handling at least this much voltage. This, of course, sets the design tolerances for the memory device. In other words, if one sense amplifier requires one particular voltage swing for its input and another sense amplifier requires a lower voltage swing for its input, then the memory which can be utilized with the latter amplifier can be made in accordance with much lower tolerance design rules and because of the lower voltage handling capability required, the individual elements and the spacings therebetween can be reduced.

Heretofore, there have been two principal approaches to the readout sensing of read-only MOS-FET memories. One is to amplify the voltage by conventional one or two stage amplifiers whose input is taken from across a load resistance connected to the output terminal of the memory unit. Using this method, the readout voltage swing is quite large, i.e., on the order of 10 volts, and produces a slow memory output due to the impedance characteristics of the device. Devices of this type typically have output reading times on the order of 2 to 4 microseconds.

The other approach which allows the memory to be scanned at a slightly higher rate involves a dynamic technique wherein the memory output is strobed. Using this technique, one or two additional signals are introduced to the chip via clock lines. These clock lines carry signals which are used to strobe the memory output and test it only during its particular interval of time. Using this technique, the data output is available for an interval greater than the clock time, but will degrade with time and therefore must be reclocked to be enhanced. Also, the data output occurs at the output terminal during the clock output phase and therefore does not allow asynchronous data outputs for asynchronous data inputs. This makes it much harder to use in a system since the output signal is available to the system only during the brief instant of time that it is strobed. During the remaining time intervals, all other information must be ignored. This is a very stringent requirement to place on most users.

A novel MOS-FET sense amplifier, which is disclosed in the copending U.S. patent application by James J. Kubinec, Ser. No. 781,017, now U.S. Pat. No. 3,560,765 filed Dec. 4, 1968 and assigned to the assignee of the present invention, has recently been developed which enables the required voltage-handling capabilities as well as the physical size of the MOS memory, to be reduced below that previously possible using the above-mentioned prior art method. The Kubinec disclosure is expressly incorporated into the present application.

Briefly, the Kubinec sense amplifier is comprised of an all-FET amplifying circuit having an input stage which is biased so as to prevent the memory read potential from swinging more than a predetermined value in reading out the "1" and "0" memory states respectively. More specifically, this technique puts a low impedance into the memory output line and clamps it at a substantially constant voltage allowing it to swing only about 100 millivolts or so between the "1" and "0" stages. By utilizing the above-mentioned Kubinec circuit, the output impedance of the memory unit can be made about 20 times lower than the best previous prior art equivalent and gives an approximate 20–1 reduction in the time constant of the memory output circuit. The small voltage swing to which the memory device is subjected also enables the physical dimensions thereof to be greatly reduced because of the lower voltage-handling capabilities required.

OBJECTS OF THE PRESENT INVENTION

It is therefore a primary object of the present invention to provide a novel sense amplifier apparatus for use with integrated circuit memory systems which utilizes only MOS-devices as components and may therefore be integrated on the same chip with the memory device.

Another object of the present invention is to provide an improved sense amplifier apparatus which limits the change in voltage on the memory output to less than 1 volt and thus increases the speed at which the memory may be interrogated.

Still another object of the present invention is to provide a novel sense amplifier apparatus which limits the voltage applied to the data cells of the memory device to a value substantially less than prior art apparatus and thus, enables a substantial reduction to be made in the chip size required in providing a given memory.

Still another object of the present invention is to provide an improved integrated circuit sense amplifier which can be fabricated integrally with an integrated circuit memory and which has a substantially faster readout time than is available in other prior art devices.

SUMMARY OF THE INVENTION

The sense amplifier of the present invention is comprised of an all FET-amplifying circuit having means for limiting the voltage swing of the read potential applied thereby to an integrated circuit memory array in sensing the "1" and "0" memory states stored therein. This is accomplished by providing upper and lower output level-limiting circuits which detect predetermined signal levels in the output of the amplifier and cause the impedance at the input of the amplifier to be adjusted to limit the output signal swings of the amplifier to within these predetermined limits. In so doing, the memory read potential is also constrained to swing with certain predetermined limits.

The present invention is an improvement over the above-mentioned Kubinec device which further reduces the readout potential to which the memory must be subjected thereby allowing a relaxation of the manufacturing tolerance of the readout device and an increase in the manufacturing yield. Moreover, the present invention enables a substantial improvement in memory readout time.

While the novel features which characterize this invention are pointed out with particularity in the claims annexed to and forming a part of this specification, the invention itself both as to its structure and manner of operation together with further objects and advantages thereof will best be understood upon reference to the following description taken in connection with the accompanying drawings.

IN THE DRAWING

DESCRIPTION OF A PREFERRED EMBODIMENT

Figure 1:
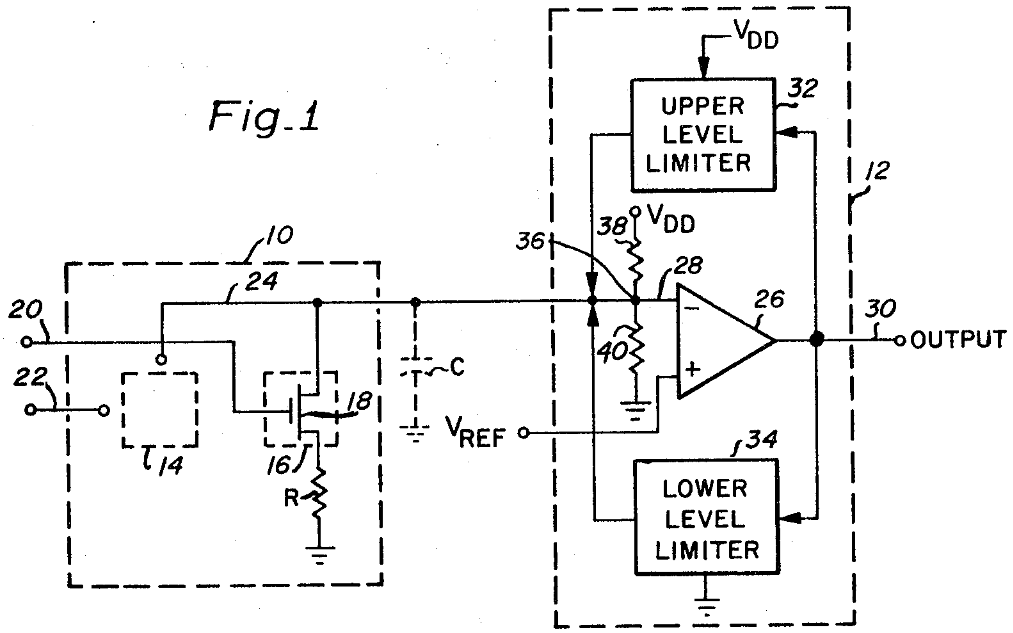
FIG. 1 is a simplified schematic of an integrated memory and sense amplifier combination in accordance with the present invention.

In FIG. 1 of the drawing, there is shown a simplified schematic embodiment of an MOS-FET memory and readout system which includes a memory unit 10 and a sense amplifier 12. The simplified memory 10 is typically embodied in an integrated circuit and includes data storage sites 14 and 16 which may or may not have switching elements disposed therein depending on whether that site is intended to represent a "0" or "1" memory state. As illustrated, the site 14 has no switching element and thus represents a "0" site whereas site 16 has a switching element 18 generally illustrated in the form of an FET and corresponds to a "1" site. The address leads 20 and 22 lead to the sites 16 and 14 respectively. Where a switching element is present, such as in the site 16, the address lead 20 is connected to the gate of the FET-device appearing therein. In the case of a "0" site such as illustrated at 14, the address lead terminates at the edge of the site in the standard configuration. A common output interconnect 24 also leads to each of the storage sites and is connected to the drain of the storage element appearing at the site. The resistance R shown connected between the source of FET 18 and circuit ground is representative of the small inherent resistance of the FET 18 in its conductive state. The capacitance C is the parasitic capacitance of the memory array.

A sense amplifier in accordance with the present invention is illustrated in simplified form at 12 and includes a differential amplifier 26 having its negative input terminal 28 coupled to the interconnect 24 of the memory 10. The potential source $V_{DD}$ is coupled to input terminal 28 through a voltage divider comprised of impedances 38 and 40 and provides a quiescent potential input at terminal 28. When the input 20 is addressed and FET 18 is rendered conductive (turned ON), the voltage on line 28 will swing from its quiescent potential to a lower potential and then back again to the quiescent potential as FET 18 is turned OFF. This voltage swing will be amplified by amplifier 26 to produce a corresponding larger output swing at the output terminal 30.

Coupled between output terminal 20 and input terminal 28 of amplifier 26 are a positive signal limiting, or clamping, circuit 32 and a negative signal limiting, or clamping, circuit 34 which operate in response to the output of amplifier 26 to limit the swing of the voltage appearing at input terminal 28 to within predetermined upper and lower signal levels. Instead of allowing the voltage at input terminal 28 to swing between the voltage divider potential at circuit point 36, and the circuit ground potential which results when one of the FETs in the memory 10 is gated on, the swing is limited at both extremes to that necessary to provide the required signal swing at output terminal 30.

In accordance with the present invention, the upper level limiter 32 is set to detect a predetermined most positive potential and provide an appropriate compensatory input signal to input terminal 24 so as to prevent the amplifier from generating an output signal exceeding the maximum positive output level. Similarly, the lower level limiter 34 is likewise made responsive to the output signal at terminal 30 to generate an appropriate signal for application to input terminal 28 so as to limit the most negative signal swing at output terminal 30 to some predetermined lower level. Thus, in accordance with the present invention, a desired output potential swing between two predetermined signal levels can be precisely obtained by the advantageous method of limiting the potential swing of the voltage applied to the memory 10 thereby improving the operative characteristics of a given amplifying circuit. For example, because of the lower potential swing, certain delay terms which were associated with previous circuit designs have been substantially eliminated since the amplifier is always operated in its linear region. When the input signal swings from the read "0" condition to the read "1" condition, only the dynamics of the input swing and the dynamics of the amplifier need be considered.

Going in the other direction, it is exactly the same situation. The change occurs at the same time and stops at the same time. There is consequently no potential storage problem, as in the previous designs, which accounted for up to 50 percent of the total switching delay in those designs. Whereas, up until recently the best available access time was from 2½ to 3 microseconds for read-only memories, and the sense amplifier disclosed by Kubinec in the above-mentioned copending application reduced the access time to 0.8 to 1 microsecond. In utilizing the present invention the access time has been reduced still further to from 0.4 to 0.7 microseconds.

Since the amplifier of the present invention is always operating in its active region, the equivalent of the term storage and turn-on delay of prior art circuits are eliminated. In addition, because of the substantially lower voltages to which the FETs of the memory must be subjected, the present invention enables the use of much broader design rules than is possible utilizing the prior art sense amplifiers. This is to say that the tolerances which must be held in the design and manufacture of the memory array can be made much less restricted. The reason for this is that the amplifier compensates for any source impedance it might be looking into. If the source impedances are very low as in the ideal read-only memory array, then the limiter feeds back very strongly. If the source impedances are very high, then the limiter feeds back only a small signal. In all cases, it adjusts the relative impedances of the array to that which is required to make the circuit function. Because of this characteristic, relative manufacturing yields for these types of memory circuits are several orders of magnitude better than it was possible to obtain in the past.

Figure 2:
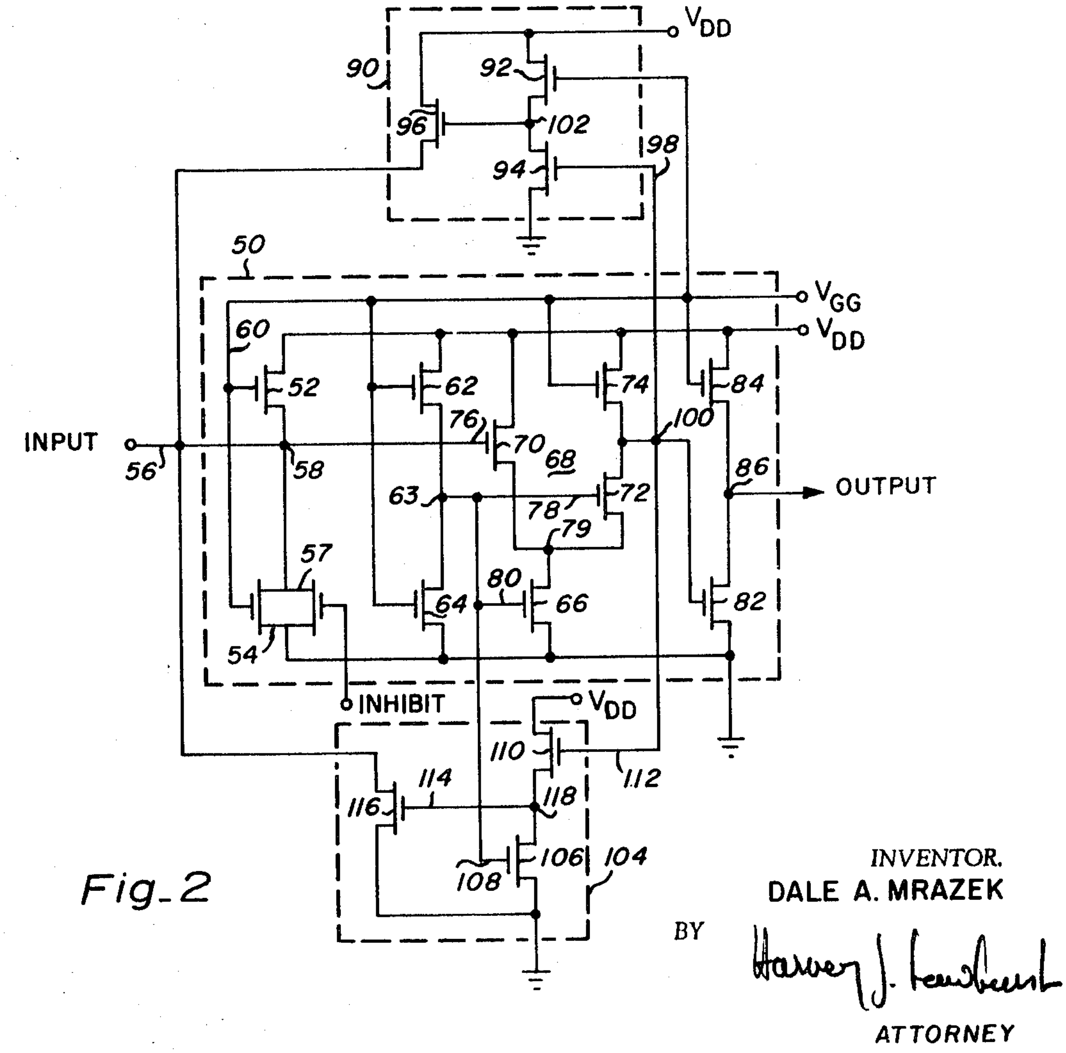
FIG. 2 is a more detailed schematic of a sense amplifier in accordance with the present invention.

Turning now to FIG. 2 of the drawing, a preferred embodiment of the present invention in integrated circuit form using only FET components will be described. Shown within the dashed lines 50 is a sense amplifier of the type described in the above mentioned Kubinec application. The sense amplifier 50 is comprised entirely of FET-devices and includes a pair of FETs 52 and 54 connected in series between the potential supply $V_{DD}$ and ground. These FETs correspond to the impedances 38 and 40 shown in the simplified embodiment of FIG. 1 and provide the read potential for the memory array. The amplifier input terminal 56 is connected to a circuit point 58 between the drain of FET 54 and the source of FET 52. The gates of both FET 52 and 54 are connected to a common potential supply $V_{GG}$ by a lead 60 and are normally biased conductive so as to act as impedances of predetermined value. $V_{GG}$ is typically set at approximately 24 volts below circuit ground and $V_{DD}$ is typically at about 12 volts below circuit ground, thus providing at point 58 a relatively large potential of about 5 volts below circuit ground. An inhibit switch 57 is also provided across FET 54.

A similar set of series connected FETs 62 and 64 are provided for supplying a gate voltage to another FET 66 that serves as a current source for the differential amplifier 68 which is comprised of an FET 70 connected in parallel with another FET 72. Another FET 74 serves as a load impedance for the amplifier 68. The gate 76 of FET 70 is connected directly to point 58 which is the circuit input. The gate 78 of the FET 72 is connected to the reference potential which is provided at point 63 between FETs 62 and 64. The gate 80 of current source FET 66 is also connected to the point 63.

An additional amplifying stage comprised of a series combination of FET 82 and FET 84 is coupled to amplifier 68 at terminal 100. FET 82 serves as an amplifier responsive to the output of the differential amplifier 68 and FET 84 serves as the load impedance for FET 82. The output of the sense amplifier 50 is taken across the drain of FET 82 at point 86.

The upper level limiter 90 is comprised of three FETs 92, 94 and 96. FET 92 acts as a load resistor and FET 94 is a simple voltage inverter of very high gain. The FET 96, in effect, acts as a variable impedance which is thrown into parallel with the FET 52 to limit the effective potential at point 58 to less than some predetermined level.

The gate 98 of FET 94 is coupled to the output terminal 100 of the differential amplifier 68. FET 94 is designed such that when the potential at terminal 100 reaches some predetermined upper signal level, the potential at node 102 is at the threshold of FET 96 causing it to become conductive. With any subsequent increase in the potential at node 100, FET 96 is turned harder on so as to shunt more negative current into the node 58 to reduce the voltage appearing at input terminal 56. Similarly, when the potential appearing at node 100 drops below a predetermined level, the potential at node 102 of limiter 90 causes FET 96 to become nonconductive so as to have no effect on the potential applied to input terminal 56.

For limiting the most negative swing of the potential at node 58, a lower level limiter 104, similar to the upper level limiter 90, is provided and includes a load FET 106 having its gate 108 coupled to the reference potential appearing at node 63 and an inverter 110 having its gate 112 coupled to the node 100. Gate 114 of FET 116 is coupled across the load 106 at point 118. FET 116 is coupled between input terminal 56 and ground so as to provide, in effect, a variable shunt impedance which can be thrown across the FET 54 to limit, to some predetermined value, the most negative potential swing at node 58.

In accordance with the illustrated preferred embodiment, the limiter 90 is designed to become active when the voltage at node 100 reaches approximately 2 volts below the substrate potential $V_{SS}$ and the limiter 104 is designed to become activated when the voltage at node 100 is driven to approximately 8 volts below the substrate potential $V_{SS}$. It will thus be noted that in accordance with the present invention, active feedback circuit means are provided which use certain predetermined voltage levels as a means of controlling the swing of the potential applied to the memory array. In the illustrated circuit, the read potential is limited to a swing of between 0.4 and 0.7 volts.

Figure 3:
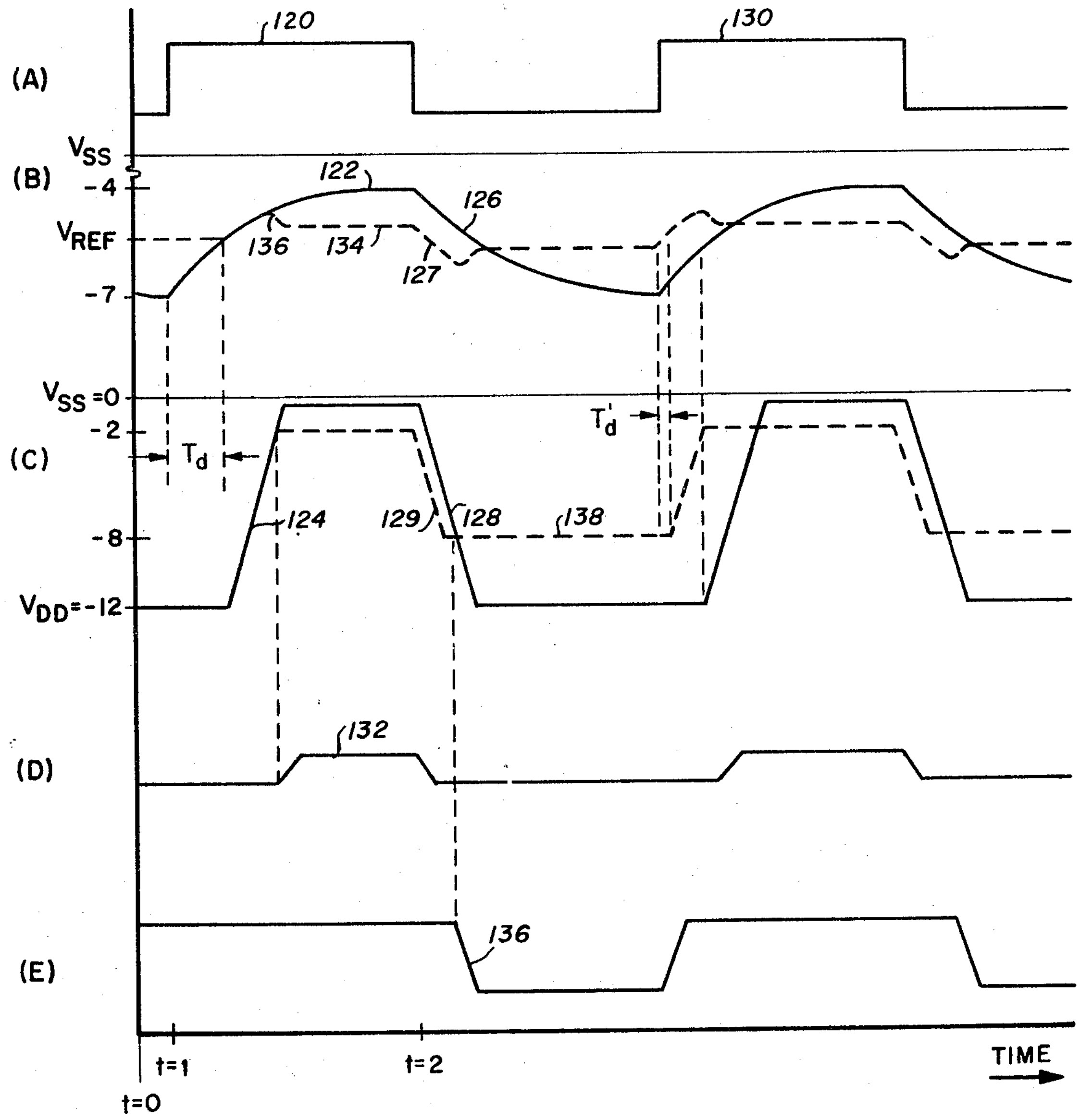
FIG. 3 is a timing diagram illustrating the operation of the present invention.

Turning now to FIG. 3 of the drawing, the operation of the present invention will be described with reference to the FIG. 2 embodiment assuming that a storage device of the type illustrated in FIG. 1 is coupled to the input terminal 56. Assuming that at $t=0$ no input is applied to the memory device and that the upper level limiter 90 and lower level limiter 104 are disconnected the voltage appearing at the node 58 will be at a negative potential determined by the voltage divider action of the impedance elements 52 and 54 as current is allowed to flow therethrough from the source $V_{DD}$ to circuit ground ($V_{SS}$). At this point, the potential at node 58 is approximately 7 volts below $V_{SS}$.

If at $t=1$ a step-input voltage pulse 120 as shown in part A of FIG. 3, is applied to a "1" input of the memory, the corresponding FET at the addressed memory site will be rendered conductive and will effectively short the input terminal 56 to circuit ground causing the potential at node 58 to rapidly go to approximately $V_{SS}$. However, because of the resistance R and capacitance C associated with the memory device (as shown in FIG. 1), the change in potential at node 58 will depend upon the RC-time constant of the memory and may resemble the curve shown at 122 in part B of FIG. 3.

Under normal conditions with no address input applied to the memory, the differential amplifier 68 is prebiased by the voltages at points 58 and 63 respectively, so that FET 70 is normally turned "ON" and FET 72 is normally turned "OFF." . This is because by design the point 58 is allowed to swing through the reference potential at point 63 by several hundred millivolts. With FET 72 turned "OFF" and FET 70 turned "ON," node 79 will be at the supply voltage $V_{DD}$. When a "1" memory site is addressed causing the potential at point 58 to rise as shown at 122, it will pass the threshold potential $V_{TH}$ at which FET 70 turns "OFF" and FET 72 turns "ON" causing the potential on node 100 to go positive towards $V_{SS}$ until it is current limited by the impedance 74. This potential will be held at slightly less than $V_{SS}$ until the end of the pulse 120, at which time the "1" memory element is gated off causing the potential at node 58 to decay exponentially as shown at 126, and the potential at node 100 will likewise return to $V_{DD}$ as shown at 128. Upon the occurrence of the next "1" pulse 130, the same sequence will be repeated.

Thus, it is seen that for each time a "1" storage element is gated "ON," without the use of the limiter circuits provided in accordance with the present invention, an output in response to a voltage swing of slightly less than 3 volts would be obtained at input terminal 58. However, since the potential required at the gate of amplifier 82 is only about 8 volts below $V_{SS}$, it is not necessary that the output be allowed to swing the full 12 as indicated. Likewise, it is not necessary that the potential applied to the memory be allowed to go all the way to $V_{SS}$ either and just as in allowing the output potential to swing excessively it lengthens the time required to address the memory cells. The upper and lower level-limiting circuits are thus provided in accordance with the present invention in order to limit the signal swings to a practical minimum.

Considering first the upper level limiter 90, the FET 96 is biased by the action of FETs 92 and 94 so as to be normally nonconductive. However, when the potential at node 100 approaches approximately 2 volts below $V_{SS}$, the potential at node 102 approaches the threshold potential of FET 96 and it begins to conduct providing an additional current path between $V_{DD}$ and the node 58. The current caused to flow through the FET 96 to node 58 in order to limit the voltage swing at node 58 is indicated by the curve 132 in part D of FIG. 3. The effect of this action is to limit the positive going swing of the voltage at node 100 to a potential of approximately 2 volts below $V_{SS}$ by limiting the positive potential swing at node 58 to slightly more than 1 volt below $V_{SS}$ as indicated at 134.

Because of the finite capacitance associated with the limiter 90, a small amount of overdrive 136 occurs to drive the voltage at point 58 down even harder. This slight overshoot provides a speed enhancement of approximately 50 nanoseconds in circuits of the type described.

At the end of the pulse 120, the "1" cell will be turned "OFF" and the potential at node 58 will again be driven negative following the curve 127 and the output at node 100 will likewise be driven negative as indicated at 129. The limiter circuit 104 now comes into play and as the potential at node 100 approaches 8 volts below $V_{SS}$, the threshold of FET 116 of lower level limiter 104 is approached so that as the potential at node 100 attempted to exceed −8 volts, a current path is opened between the substrate and node 58 through FET 116. The current through FET 116 to node 58 may be represented as indicated in part E of FIG. 3 at 136 and serves to limit the output at node 100 to 8 volts below $V_{SS}$ as shown at 138 by clamping the input voltage at node 58 about 400 millivolts more negative than the reference voltage at node 63.

Upon the occurrence of the next address pulse 130 to a "1" memory cell the potential at node 58 will again be driven in the positive direction but this time it will start much nearer the threshold potential $V_{REF}$ and thus the time delay $T_d$ between the start of pulse 130 and the response at terminal 100 will be substantially reduced as compared to the delay time $T_d$ without the limiting circuits. Thus, it will be seen that by utilizing the two level-limiting circuits of the present invention, the input potential swing has been limited to approximately 1 volt and the address speed has been substantially increased.

By virtue of the level-limiting circuits, the amplifier of the present invention compensates for whatever source impedance might be provided to it, i.e., if the source impedances are very low as in the ideal read-only memory array, it feeds back very strongly. However, if the source impedances are very high, then it feeds back only a small amount of current. In other words, it adjusts the relative impedances of the array to that which is required to make the circuit function at its optimum performance level. Since the characteristic impedances of a given memory array depend on the size of the array and the processing variations of the manufacturing facility vary over a wide range, the amplifier provided by the present invention is of great value in that the impedance variations are absorbed as the amplifier automatically adjusts to the circuit it's operating into rather than merely existing with the circuit to which it is connected.

Previously, the yields of monolithic memory circuits were very low because of the narrow tolerances which were required to make the circuit acceptable. However, because of the present invention, a practical mass producible circuit is now available. This invention has greatly enhanced the manufacturing probability while at the same time, materially increased the access time available in a read-only system. Whereas, heretofore the best known access time was in the range of 0.8 to 1.0 microseconds the access time of the present invention is in the range of 0.4 to 0.7 microseconds. After having read the above disclosure, many alterations and modifications of the invention will no doubt be apparent to those skilled in the art. It is therefore to be understood that this description is of a preferred embodiment set forth for purposes of illustration only and is in no manner intended to be limiting. Accordingly, I intend that the appended claims be interpreted as covering all modifications which fall within the true spirit and scope of my invention.

What is claimed is:

1. A sense amplifier, comprising:

a first source of potential and a second source of potential;

an input terminal and an output terminal;

means for developing a reference potential including, a first FET having a first gate, a first source, and a first drain coupled to said first source of potential, and a second FET having a second gate, a second source coupled to said second source of potential, and a second drain coupled to said first source;

a differential amplifier responsive to an input signal applied to said input terminal and operative to develop an output signal at said output terminal, and including, a third FET having a third gate coupled to said input terminal, a third source coupled to said second source of potential, and a third drain coupled to said first source of potential, and a fourth FET having a fourth gate coupled to said second drain for receiving said reference potential, a fourth drain coupled to said first source of potential, and a fourth source coupled to said third source;

voltage-dividing means normally biasing said input terminal to a quiesent potential, said voltage-dividing means including, a first impedance coupled between said first source of potential and said input terminal, and a second impedance coupled between said input terminal and said second source of potential;

first signal-limiting means responsive to said output signal and operative to prevent said input signal from becoming more positive than a first predetermined potential; and second signal-limiting means responsive to said output signal and operative to prevent said input signal from becoming more negative than a second predetermined potential.

2. A sense amplifier as recited in claim 1 wherein said first signal-limiting means includes, a fifth FET having a fifth gate, a fifth source coupled to said input terminal, and a fifth drain coupled to said first source of potential, and an inverter circuit responsive to said output signal and operative to apply a voltage proportional to said output signal to said fifth gate.

3. A sense amplifier as recited in claim 2 wherein said inverter circuit includes a sixth FET having a sixth gate for receiving a voltage proportional to said output signal, a sixth source coupled to said second source of potential, and a sixth drain coupled to said fifth gate.

4. A sense amplifier as recited in claim 1 wherein said second signal-limiting means includes, a fifth FET having a fifth gate, a fifth source coupled to said second source of potential, and a fifth drain coupled to said input terminal, and an inverter circuit responsive to said output signal and operative to apply a voltage proportional to said output signal to said fifth gate.

5. A sense amplifier as recited in claim 4 wherein said inverter circuit includes a sixth FET having a sixth gate for receiving a voltage proportional to said output signal, a sixth source coupled to said fifth gate and a sixth drain coupled to said first source of potential.

6. A sense amplifier as recited in claim 1 wherein said first impedance includes a fifth FET having a fifth grade, a fifth source coupled to said input terminal, and a fifth drain coupled to said first source of potential, and said second impedance includes a sixth FET having a sixth gate, a sixth source coupled to said second source of potential, and a sixth drain coupled to said input terminal.

* * * * *